United States Patent
Dallager et al.

(10) Patent No.: US 12,221,266 B2
(45) Date of Patent: Feb. 11, 2025

(54) SHAKER SYSTEM AND METHOD

(71) Applicants: John Dallager, Dallas, TX (US); Steven Mccarthy, Dallas, TX (US)

(72) Inventors: John Dallager, Dallas, TX (US); Steven Mccarthy, Dallas, TX (US)

( * ) Notice: Subject to any disclaimer, the term of this patent is extended or adjusted under 35 U.S.C. 154(b) by 0 days.

(21) Appl. No.: 17/446,120

(22) Filed: Aug. 26, 2021

(65) Prior Publication Data
US 2022/0063896 A1    Mar. 3, 2022

Related U.S. Application Data

(60) Provisional application No. 63/070,647, filed on Aug. 26, 2020.

(51) Int. Cl.
| | |
|---|---|
| *B65D 81/32* | (2006.01) |
| *A47J 43/27* | (2006.01) |
| *B01F 35/32* | (2022.01) |
| *B01F 101/16* | (2022.01) |
| *C12G 3/005* | (2019.01) |
| *C12G 3/04* | (2019.01) |

(52) U.S. Cl.
CPC .......... *B65D 81/3205* (2013.01); *A47J 43/27* (2013.01); *B01F 35/32021* (2022.01); *C12G 3/005* (2013.01); *C12G 3/04* (2013.01); *B01F 2101/16* (2022.01)

(58) Field of Classification Search
CPC .... A47J 43/27; Y10S 215/08; B65D 81/3211; B65D 81/32; B65D 81/3205
USPC .......... 206/564, 217; 220/568, 23.83, 23.86; 215/DIG. 8
See application file for complete search history.

(56) References Cited

U.S. PATENT DOCUMENTS

| | | | | |
|---|---|---|---|---|
| 2,660,171 A | * | 11/1953 | Dickinson, Jr. ...... | B65D 25/082 604/416 |
| 3,326,400 A | * | 6/1967 | Hamelin ............ | B65D 51/2871 215/DIG. 8 |
| 5,279,841 A | * | 1/1994 | Yu ........................ | B65D 71/502 206/821 |
| 5,803,294 A | * | 9/1998 | Bello ..................... | B65D 77/08 220/4.27 |
| 5,807,597 A | * | 9/1998 | Barnes ............... | B65D 81/3205 426/407 |
| 6,814,990 B2 | * | 11/2004 | Zeng .................. | A47G 19/2205 206/217 |
| 6,945,393 B2 | * | 9/2005 | Cho ...................... | B65D 51/24 215/DIG. 8 |

(Continued)

FOREIGN PATENT DOCUMENTS

WO    WO2021078921 A1    4/2021

OTHER PUBLICATIONS

PCT Search Report with Written Opinion issued on PCT/US22/41581; Nov. 30, 2022; 8 pages.

*Primary Examiner* — Steven A. Reynolds
*Assistant Examiner* — Prince Pal
(74) *Attorney, Agent, or Firm* — Braxton Perrone, PLLC; Bobby W. Braxton; Gregory Perrone

(57) ABSTRACT

A shaker for housing and dispensing food or drink items. The shaker has a top can sitting atop a bottom can. Each can contains a separate component. The top can is removed and its contents are added to the second can. This allows the user to control how much of the contents from the top can are added to the bottom can. A single multi-compartment vessel houses two separate ingredients and prevents their mixing.

18 Claims, 4 Drawing Sheets

(56) References Cited

U.S. PATENT DOCUMENTS

| | | | | |
|---|---|---|---|---|
| 8,061,545 | B2 * | 11/2011 | Roth | B65D 81/3205 206/217 |
| 8,147,120 | B2 * | 4/2012 | Renna | A47J 43/27 215/DIG. 8 |
| 8,292,099 | B1 * | 10/2012 | Wahlstrom | A61J 1/2031 215/11.4 |
| 8,365,960 | B1 * | 2/2013 | Kalaouze | B65D 81/3211 206/229 |
| 8,584,882 | B2 * | 11/2013 | Hammerle | A47J 43/27 220/4.27 |
| 8,672,123 | B1 * | 3/2014 | Vallejo | A61J 9/00 222/153.04 |
| 8,834,948 | B2 * | 9/2014 | Estabrook | B65D 81/3216 426/115 |
| 8,899,427 | B2 * | 12/2014 | Harris | A61J 9/008 215/11.4 |
| 9,199,779 | B2 * | 12/2015 | Zoss | B65D 81/3205 |
| D768,507 | S * | 10/2016 | Hotell | D9/746 |
| 9,642,497 | B2 * | 5/2017 | Schlesinger | B65D 81/361 |
| 10,638,862 | B2 * | 5/2020 | Calderaio | B65D 77/0493 |
| D953,123 | S * | 5/2022 | de Sicart | D7/629 |
| D964,861 | S * | 9/2022 | Vidmar | D9/745 |
| 11,465,822 | B2 * | 10/2022 | Weiner | A47G 19/02 |
| 11,659,945 | B2 * | 5/2023 | Calderaio | A47G 19/2205 220/703 |
| 2001/0022305 | A1 * | 9/2001 | Cavella | B65D 17/4012 220/258.2 |
| 2005/0211579 | A1 * | 9/2005 | Makita | B65D 51/2842 206/219 |
| 2006/0049127 | A1 * | 3/2006 | Katz | B65D 81/3211 215/DIG. 8 |
| 2006/0076353 | A1 * | 4/2006 | Wu | B65D 51/2864 220/521 |
| 2008/0011624 | A1 * | 1/2008 | Robb | B65D 81/3205 206/219 |
| 2008/0023348 | A1 * | 1/2008 | Herzog | B65D 77/2024 206/217 |
| 2008/0123464 | A1 * | 5/2008 | Griffin | B65D 81/3205 220/676 |
| 2008/0164253 | A1 * | 7/2008 | Truong | B65D 77/0486 220/729 |
| 2008/0210686 | A1 * | 9/2008 | Shapiro | B65D 1/34 220/4.27 |
| 2009/0288965 | A1 * | 11/2009 | Greenberg | B65D 81/3211 206/222 |
| 2010/0006579 | A1 * | 1/2010 | Roth | A47J 39/006 220/592.2 |
| 2010/0015293 | A1 * | 1/2010 | Shapiro | B65D 21/0219 206/524.4 |
| 2010/0104716 | A1 | 4/2010 | Stokes | |
| 2010/0200582 | A1 * | 8/2010 | Hammerle | A47J 43/27 220/4.27 |
| 2011/0132781 | A1 * | 6/2011 | Willat | B65D 77/0493 206/217 |
| 2011/0163102 | A1 * | 7/2011 | Haynie | B65D 51/28 220/521 |
| 2011/0204048 | A1 * | 8/2011 | Carino | B65D 21/083 220/4.03 |
| 2011/0240589 | A1 * | 10/2011 | Averill | B65D 41/18 215/321 |
| 2011/0266170 | A1 * | 11/2011 | Ligon | B65D 51/2807 206/219 |
| 2011/0266247 | A1 * | 11/2011 | Littrell | B65D 51/2807 215/316 |
| 2012/0061275 | A1 * | 3/2012 | Buck | B65D 81/3205 220/729 |
| 2012/0193316 | A1 * | 8/2012 | Starks | B65D 81/3205 215/6 |
| 2013/0037506 | A1 * | 2/2013 | Wahlstrom | A61J 1/2093 215/6 |
| 2013/0056476 | A1 * | 3/2013 | Buck | B65D 81/3205 220/592.2 |
| 2013/0200086 | A1 * | 8/2013 | Miller | A47G 19/22 220/709 |
| 2014/0314937 | A1 * | 10/2014 | Wang | A47J 31/402 220/568 |
| 2015/0050405 | A1 * | 2/2015 | Trager | C12G 3/04 426/519 |
| 2015/0203274 | A1 * | 7/2015 | Gitta | B65D 81/3211 206/219 |
| 2016/0029846 | A1 * | 2/2016 | Zickler | A47J 43/27 206/219 |
| 2016/0058247 | A1 * | 3/2016 | Hogan | A47J 43/27 220/568 |
| 2016/0166115 | A1 * | 6/2016 | Schlesinger | B65D 81/3216 220/568 |
| 2016/0264348 | A1 * | 9/2016 | Camera | B65D 85/8043 |
| 2016/0270600 | A1 * | 9/2016 | Pappas | A47J 43/27 |
| 2020/0407109 | A1 * | 12/2020 | Vinger | B65D 17/34 |
| 2021/0212521 | A1 * | 7/2021 | Langgaard | A47J 43/27 |
| 2021/0284427 | A1 * | 9/2021 | Rojas | B65D 43/0231 |
| 2021/0387781 | A1 * | 12/2021 | Ricchetti | B65D 81/3211 |
| 2022/0063896 | A1 * | 3/2022 | Dallager | B01F 35/32021 |

* cited by examiner

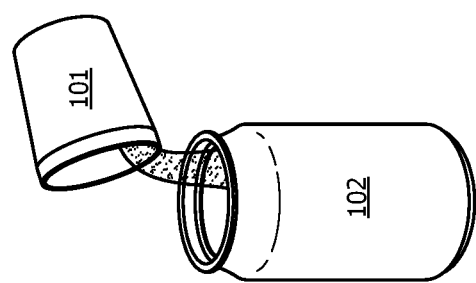
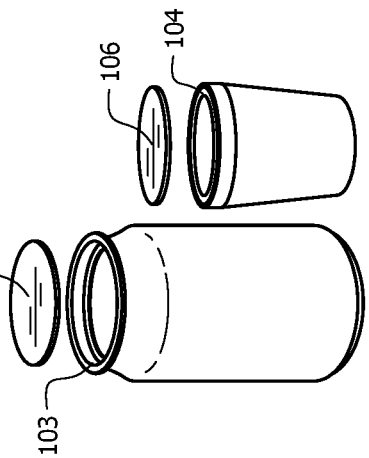
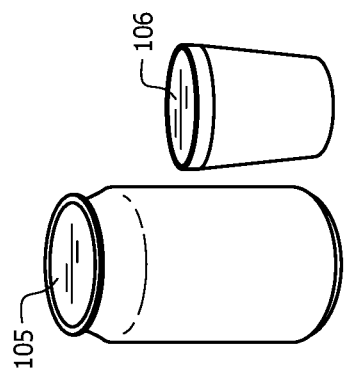
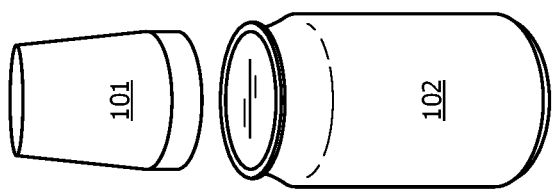
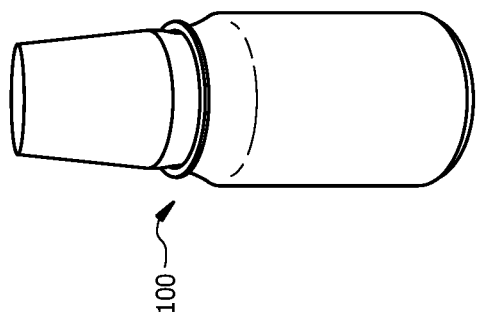

SHAKER SYSTEM AND METHOD

PRIORITY

The present invention claims priority to U.S. 63/070,647, filed Aug. 26, 2020, the entirety of which is hereby incorporated by reference.

BACKGROUND OF THE INVENTION

Technical Field

The present invention relates to a system and method for a shaker.

Description of Related Art

Cocktails typically are mixed from several different ingredients. There are no suitable ways to pre-package cocktails.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 3A is a perspective view of the shaker being used in one embodiment;

FIG. 3B is a perspective with the top can being removed in one embodiment;

FIG. 3C is a perspective view with the two cans sitting adjacent one another in one embodiment;

FIG. 3D is a perspective view with the lids removed in one embodiment;

FIG. 3E is a perspective view with the top can being poured into the bottom can in one embodiment;

DETAILED DESCRIPTION

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 1:
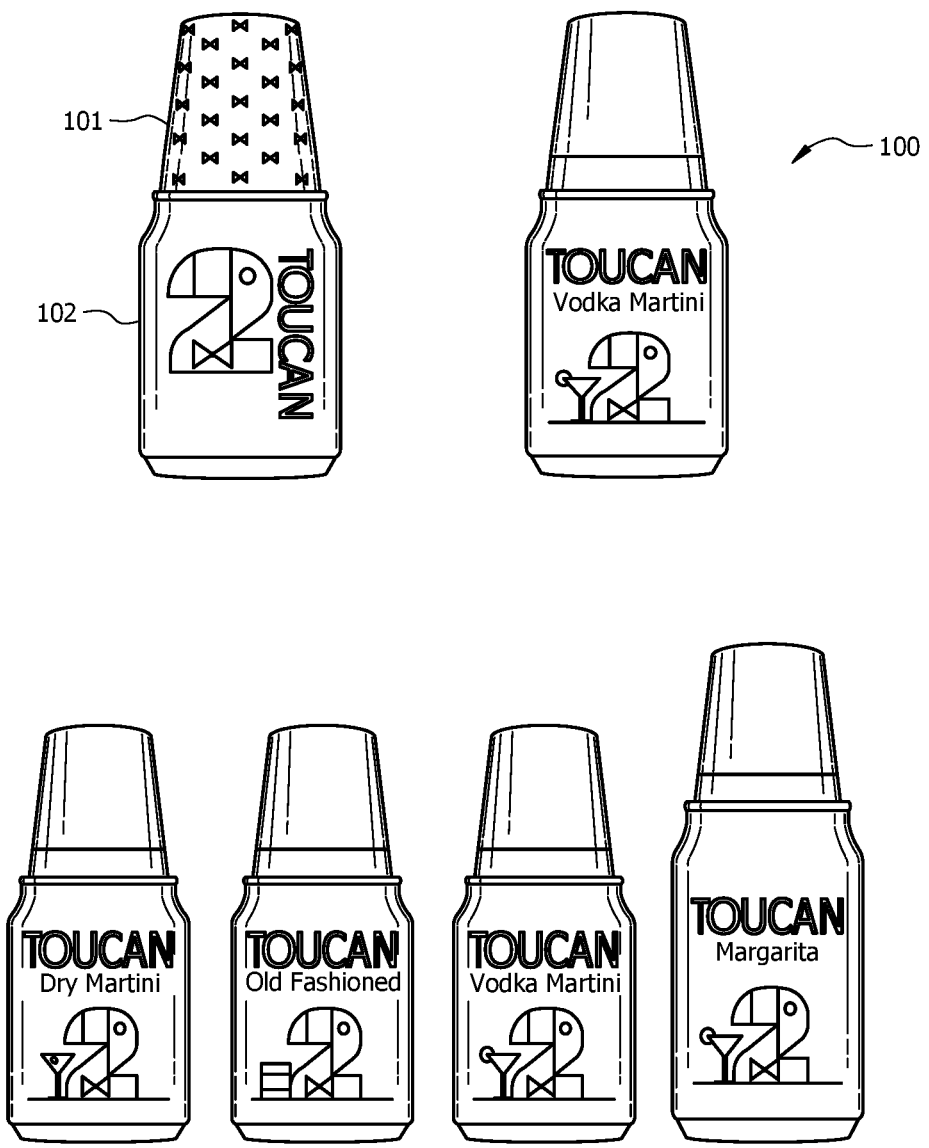
FIG. 1 is a side view of shakers in one embodiment.

FIG. 1 is a side view of shakers in one embodiment. A shaker 100 has two components, and top can 101 and a bottom can 102 releasably coupled to form a unitary item. In one embodiment the shaker 100 has the top can 101 and the bottom can 102 packaged as a combined item.

The two respective cans 101, 102 can be coupled to form a single shaker 100 via any method. Thus, in one embodiment the two cans 101, 102 are packaged and sold as a single unit for consumption of goods. In such embodiments the multi-compartment vessel provides a single sanitary package for separating two separate ingredients in the form of a liquid, gas, or solids. This single package provides consumers with a ready to drink, or ready to eat, product which meets mixed ratio preferences, extended shelf life, and condensed size for improved portability.

The top can 101 and bottom can 102 can be coupled together via any method or device known in the art. In one embodiment the top can 101 and bottom can 102 are coupled via friction. Specifically, in one embodiment the top can 101 has an outer diameter which is nested via friction into the outer diameter of the bottom can 102. This friction keeps the two cans coupled until a force is applied to separate them.

In one embodiment the top of the top can 101 is designed to fit comfortably to the top of the bottom can 102 via lid-to-lid mechanical fitment. Thus, the top of the top can 101 couples to the top of the bottom can 102 in such embodiments. In other embodiments, however, the bottom of the top can 101 fits with the top of the bottom can 102.

While one embodiment has been discussed wherein the two cans 101, 102 are kept together via friction fit, in other embodiments, however, the two cans can be coupled via an external coupling such as shrink wrap, plastic, metallic bindings, etc. The external coupling would keep the cans in a coupled relationship until the user desires to separate the two for use, as will be discussed in more detail below.

Figure 2:
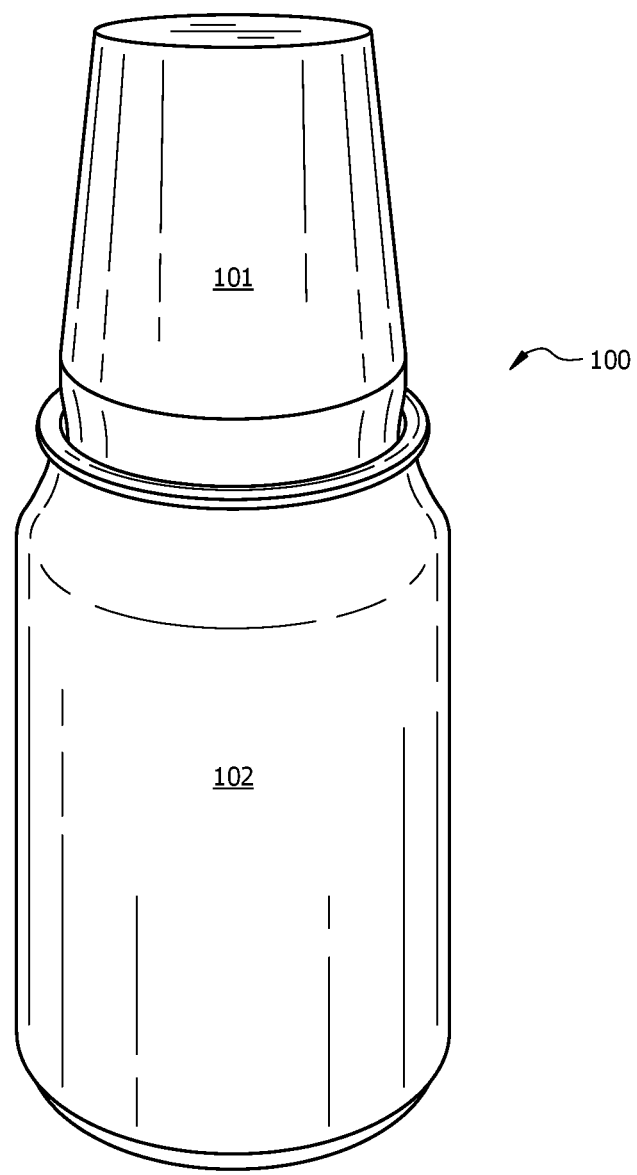
FIG. 2 is a perspective view of a shaker in one embodiment.

FIG. 2 is a perspective view of a shaker in one embodiment. As can be seen, in this embodiment the top can 101 is smaller and sits upon the larger bottom can 102. While the term "can" is used, this is for illustrative purposes and should not be deemed limiting. Any container which houses a liquid can be utilized. Thus, the term "can" includes any cup, vessel, or package which can house a liquid. While a generally cylindrical can is depicted, this is not limiting. Virtually any shape can be utilized. The cans 101, 102 can comprise virtually any material. In one embodiment the cans 101, 102 comprise aluminum. Full strength alcohol, generally being above 25% in strength, it not able to be housed in a standard CPG beverage aluminum container with traditional sanitary and safety lining, typically BPA. The higher percentage of alcohol being closer to industry standard full-strength spirits (typically 40%) erodes the BPA lining during storage and shelf life, estimated by packaging experts to be about 3 months.

In one embodiment the cans 101, 102 can comprise aluminum, tin, and PET. However, alterative materials can also be used to improve performance or promote green manufacturing practices. In one embodiment, to allow for a true full strength alcohol cocktail to be made and housed in the top can 101 or bottom can 102, the cans 101, 102 can use, for example, PET (or any derivative of plastics) or tin for the vessel housing the spirit. Tin an PET are used as illustrative examples and should not be deemed limiting. The top 101 or bottom cans 102 can use an aluminum vessel if using lower strength alcohol (spirit, wine, or malt) below 25% strength. For example the top 101 or bottom cans 101 can comprise aluminum with a BPA lining if used with 25% or below spirits. The container which did not house the spirits can comprise any material. Turning to FIG. 3, FIG. 3 is a perspective view a series of sequences of the shaker being used in one embodiment. FIG. 3A is a perspective view of the shaker being used in one embodiment. FIG. 3B is a perspective with the top can being removed in one embodiment. FIG. 3C is a perspective view with the two cans sitting adjacent one another in one embodiment. FIG. 3D is a perspective view with the lids removed in one embodiment. FIG. 3E is a perspective view with the top can being poured into the bottom can in one embodiment.

In FIG. 3A, the top can 101 is coupled to the bottom can 102. As previously noted, this can be accomplished in a variety of methods.

In FIG. 3B, the top can 101 has been decoupled from the bottom can 102. In one embodiment this requires removing an external coupler. In other embodiments it requires applying a force to decouple the two cans. In whatever way the two cans are decoupled, they are separated for future use.

FIG. 3C shows the two cans separated and situated adjacent to one another. As seen in FIG. 3C, in one embodiment the top can 101 and the bottom can 102 each have their own respective lids. The bottom can 102 has a bottom can lid 105, and the top can 101 has a bottom can lid 106. Thus, if either can is turned over the internal contents will not spill or leak.

The term "lid" refers to any opening which seals the container when intact but which provides access to the internal contents of the contained when the lid is opened. The lid can be a reusable lid whereby the lid can be removed and then resecured to reseal the container. In other embodiments the lid comprises a single use container whereby when the lid is removed it cannot be resealed. As an example, in one embodiment, the lid can comprise a typical pop can prevalent in soda or beer cans. In another embodiment, the lid can comprise film, foil, plastic, or other variation used in the food and beverage industry. In some embodiments the lids are heat-sealed to the can or vessel and torn away for consumption. In other embodiments the lids have score lines which allow for separation upon application of a force.

In one embodiment the lid comprises 360 degree opening. A 360 degree opening is an opening which extends across the internal periphery of the can. Compared to a typical soda can which has an opening only on one limited side, a 360 degree opening provides access along the entire internal periphery.

In one embodiment the 360 opening lid comprises a pull tab whereby the lid can be removed to leave a 360 degree opening 103, 104. FIG. 3D shows an embodiment wherein the lids have been removed from the top can 101 and the bottom can 102. The bottom can opening 103 is a 360 degree opening in that it can be poured from any angle. Put differently, all angles are similar compared to a traditional soda can, for example, which only has an opening on one side. In a 360 degree opening, the opening is substantially uniform. Similarly, the top can opening 104 is a 360 degree opening, as depicted. In this embodiment, the top can 101 and the bottom can 102 both comprise lids which provide a 360 degree opening. Thus, a user can pick up either the top can 101 or the bottom can 102 and drink or pour from any angle.

It should be noted that while FIG. 3D shows that both cans 101, 102 have a lid which yields a 360 degree opening, this is for illustrative purposes only and should not be deemed limiting. In other embodiments, for example, only one can will have a lid which yields a 360 opening. In one embodiment the bottom can 102 has a lid which yields a 360 degree opening but the top can 101 does not.

Turning to FIG. 3E, FIG. 3E shows where the contents of the top can 101 are poured into the bottom can 102. The contents of the top can 101 can comprise solids, liquids, or combinations thereof. As an example, in one embodiment the bottom can 102 comprises unsweet tea, whereas the top can 101 comprises a sweetener such as sugar. The sweetener can be added to the top can 101. This allows the user to optimize how much of the contents from the top can 101, in this case, sweetener, is added to the contents in the bottom can 102. Thus, rather than simply offering "sweet" or "non-sweet" tea, the user can customize the amount of supplement ingredient, from the top can 101, added to the base ingredient, stored in the bottom can 101.

In one embodiment the top can 101 stores the solute. The size and volume of the top can 101 can vary. In one embodiment the top can 101 has a volume of between 50-120 mL. The bottom can 102, in one embodiment, houses a solvent. The user can then open both the top 101 and bottom cans 102. The user can select a desired amount of solute from the top can 101 to pour into the bottom can 102. The user can also add ice or other ingredients to the bottom can 102. The emptied top can 101 can then be placed atop the bottom can 102 to form a shaker whereby the user can shake the ingredients in the shaker. In one embodiment each package comes with a standard solute to solvent mixed ratio. However, as noted, the user can adjust this ratio as needed. Further, while an embodiment has been discussed wherein the bottom can 102 houses a solvent and the top can 101 houses the solute, in other embodiments the opposite is used.

While tea has been discussed, in other embodiments the top can 101 can comprise milk or cream, and the bottom can 102 comprises coffee. Virtually any combination of a supplemental ingredient which can be added to a base ingredient can be utilized. The shaker 100 allows the ingredients to be separated to allow the user to specifically customize and determine the amount added to the bottom can 102 from the top can 101.

While examples have been provided whereby the bottom can 102 houses a liquid, this is for illustrative purposes and should not be deemed limiting. In other embodiments the bottom can 102 houses a solid. As but one example, the bottom can 102 contains cereal, and the top can 101 comprises milk. Once the top can 101 has been separated from the bottom can 102, and the respective lids have been removed, the milk can be added to the cereal in the bottom can 102.

As can be seen, lids which yield a 360 degree opening have several advantages. When contents are poured from the top can 101 to the bottom can 102, having a 360 degree opening increases the available surface area to both pour and receive contents.

As noted, the top can 101 can comprise solids, liquids, or combinations thereof. In one embodiment the shaker 100 is packaged to make a cocktail. In one such embodiment the bottom can 102 comprises the ingredients for a cocktail, and the top can 101 comprises the alcohol. There are many different possibilities which can use this arrangement. As an example, the bottom can 102 can include the mixer such as Coca Cola, the solvent, and the top can 101 includes alcohol such as rum, the solute. The resulting cocktail is a rum and coke. Other cocktails can be similar mixed including an Old-Fashioned, a Martini, Manhattan, Margarita, etc. In another embodiment the mixer is stored in the top can 101 and the alcohol is stored in the bottom can 102.

In one embodiment the top can 101 holds 100 mL of alcohol which can then be mixed with the bottom can 102. One advantage of separate packaging is that it allows the user to customize how much alcohol, for example, is added to the bottom can 102. If the user wants a particular strong Old-Fashioned, for example, the user can utilize all of the alcohol from the top can 101. If the user wants a softer Old-Fashioned, the user need not utilize all of the alcohol from the top can 101.

In one embodiment the top can 101 has a top opening of about 52 mm and a thickness of about 1 mm. The total height is about 60 mm, in one embodiment. It has an operational volume of about 100 mL.

The volume of liquid in the bottom can 102 vary depending upon the contents of the bottom can 102 and the contents of the top can 101. In some embodiments wherein the shaker 100 provides a cocktail, the bottom can 102 has at least sufficient volume to receive the entirety of the volume from the top can 101. Thus, if the bottom can 102 is a 12 ounce can, it is not filled entirety but instead provides sufficient room for at least a portion, if not all, of the contents of the top can 101. A standard 12 ounce can typically holds about 355 mL. However, if the top can 101 holds 100 mL, in some embodiments a 12 ounce bottom can 102 will only be filled with between 120-250 mL of liquid. This allows sufficient room to accommodate the contents of the top can 101.

In such embodiments, the alcohol, for example, will be added to the bottom can 102. Once added, the entirety of the contents will take up almost all of the volume of the bottom can 102. Such embodiments are good for mixtures or cocktails which can be used straight from the bottom can 102 without requiring ice.

Some cocktails, however, often utilize ice. Further, in some embodiments the shaker 100 will not be stored in a refrigerator. Thus, to cool the cocktail, ice can be necessary in some embodiments. Accordingly, in some embodiments the bottom can 102 is short filled. As used herein, a short-filled can refers to a can which is filled less than 92% capacity. In other embodiments the short-filled can is filled only 15-50% of its capacity. A short-filled has an advantage of being able to accommodate a portion, if not all, of the contents from the top can 101, but can also accommodate ice. Consider the Old-Fashioned example discussed above. Whether the shaker 100 is stored in the refrigerator or not, a user typically wants ice with an Old-Fashioned. By utilizing a short-filled can for the bottom can 102, after mixing alcohol from the top can 101 into the bottom can 102, the user can add ice to the bottom can 102. This is due to the availability of volume to accommodate the ice since it is short-filled. The user can add the ice and drink straight from the bottom can 102. In another example, for a Vodka Lemon Martini, a typical 8 ounce bottom can 102 can be used but only contain about 60 mL, about 2 fluid ounces. This provides the necessary room to receive the contents from the top can 101, as well as other ingredients such as ice. As another non-limiting example, in one embodiment the margarita bottom can 102 is a 12 ounce can but will only comprise 150 mL (5 fluid ounces) for the same reason.

The short-filled can 102 can be partially filled with a liquid, such as a mixer, and then filled with an inert gas, such as a nitrogen blanket to maintain the pressure in the can 102. As noted, a short-filled can 102 offers the advantage of allowing a single can 102 to be used to store the mixer, mix the cocktail, and serve the cocktail over ice. The user need not obtain other shakers, containers, etc. Instead, everything that the user needs to pour and mix a cocktail is contained with the shaker 100.

In one embodiment, after pouring the contents from the top can 101 into the bottom can 102, the top can 101 can be placed atop the bottom can 102. Because there are no lids between the two, the top can 101 can be used as a lid. The user can use the combination as a shaker to better mix the drink, for example.

In another embodiment the package is used for a sports drink. A powdered ingredient, the solute, such as protein supplements, energy supplements, hydration compounds, vitamins, flavor components, sugar, etc., can be stored in the top can 101. The liquid ingredient such as water or milk is stored in the bottom can 102.

In another embodiment the package is used for a dehydrated food mixture. The dehydrated food can comprise any dehydrated good such as rice, noodles, vegetables can be stored in either the top can 101 or the bottom can 102. Water, or other liquid, can be stored in the other can. The ingredients can be mixed, and if necessary, heated to cook the food.

As noted the package can also be used for coffees, teas, or the like. A liquid ingredient such as flavor mix, creamer, milk, oat milk, almond milk, sweetener, protein, etc. can be in one can. A liquid ingredient such as coffee or tea can be stored in the other can. The user can decide how much of the milk or creamer can be mixed with the coffee, as an example. The top can 101 can be recoupled to the bottom can 102 to serve as a shaker to mix the drink together.

Figure 4:
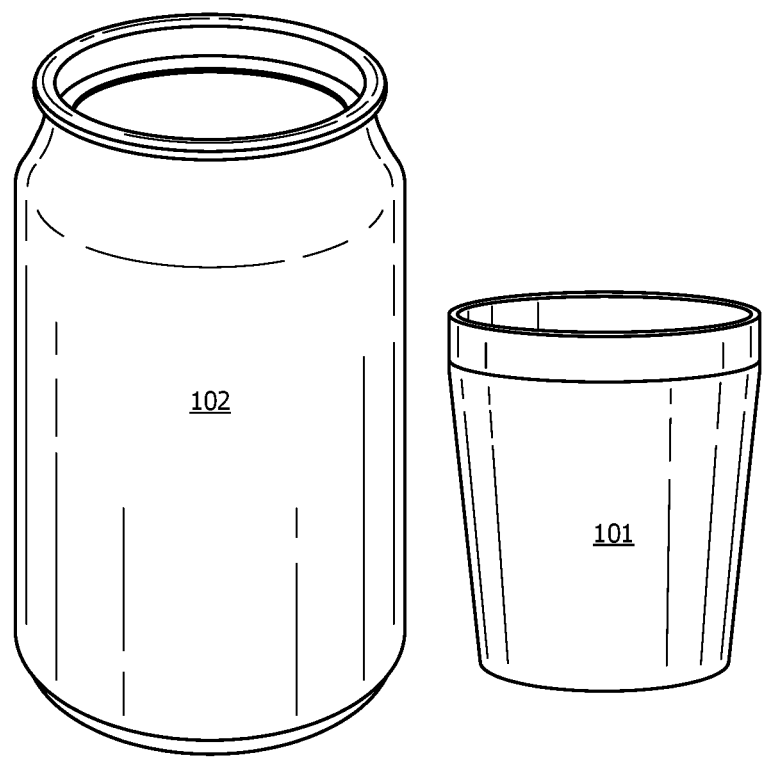
FIG. 4 is a perspective view of a separated shaker in one embodiment.

FIG. 4 is a perspective view of a separated shaker in one embodiment. As can be seen, both the top can 101 and the bottom can 102 have a 360 degree opening. As noted, this makes pouring contents, receiving contents, and drinking easier as it can occur at any side or location on the top opening.

While a system has been described in reference to a top can and a bottom can, this is for illustrative purposes only and should not be deemed limiting. In one embodiment, so long as the two dissimilar components are stored and housed to prevent mixing, other types of vessels can function as well. As an example, the multi-compartment vessel can comprise two cans which sit adjacent. While a top and bottom arrangement has the benefit of decreased footprint on the shelf, other side-by-side arrangements can also be utilized.

While a system has been described, a method of using the system will now be described. In one embodiment, the method involves pouring one ingredient from a can into another can. As an example, a method of making a drink, in one embodiment, has the following steps: a) obtaining a multi-compartment, wherein said multi-compartment vessel comprises a top can and a bottom can, wherein said top can comprises a solute, and wherein said bottom can comprises a solvent, and wherein said solute and solvent are separately housed to prevent mixing; b) removing a lid from said top can and a lid from said bottom can; c) pouring at least some solute from said top can into said bottom can. As noted, the top and bottom can can be vertically oriented such that the top can is coupled to the bottom can. As noted, in one embodiment the top of the top can is coupled to the top of the bottom can. However, the top can can be oriented in any fashion.

The system and method described herein has a plurality of advantages. First, the consumer can purpose all of the necessary ingredients for the food or drink item with the purchase of a single shaker. The consumer need not separately purchase each ingredient to make an Old-Fashioned, as an example. Instead, the consumer obtains a one-stop-shot for all of the ingredients for a cocktail.

Sticking with the cocktail example, different cocktails require different mixers and alcohols. Thus, if a consumer wants a martini and a margarita, as an example, they have to purchase vodka and tequila. If a consumer only wants a margarita occasionally, it might not be worth it to purchase an entire bottle of tequila. This system allows the consumer to purchase smaller and distinct quantities of the cocktail they desire, without having to purchase larger and more expensive bottles of mixer, alcohol, etc. Thus, the user can sample a variety of cocktails without purchasing several bottles of alcohol.

Second, the system and method offers the tools necessary to enjoy the contents. Sticking with the cocktail example, the alcohol can be mixed with the mixer and consumed straight from the bottom can 102. In an embodiment wherein the bottom can 102 is short-filled, the user can simply add ice to the bottom can 102 and enjoy straight from the can 102. The user need not obtain separate drinking glasses, tumblers, etc. Instead, the user uses the can 102. This is ideal in situations whereby a separate container is not readily available. If the user is on a boat, for example, where a separate container is not available, being able to enjoy straight from the can 102 is a considerable advantage. Likewise, glass is often prohibited in pools. Thus, being able to enjoy a cocktail from a can 102 provides advantages over prior art cocktail glasses.

As noted, in some embodiments the top can 101 can be placed atop the bottom can 102 and used as a shaker to mix the drink or food contents. Thus, this system eliminates other equipment such as shakers or stirrers.

The system and method allows other contents to be enjoyed straight from the can 102 as well. Considering the cereal and milk example previously discussed, once the milk from the top can 102 is poured into the bottom can 102 housing the cereal, the cereal can be enjoyed straight from the bottom can 102.

Another advantage is that it provides an opportunity to show case and market mixes. Perhaps a consumer is unwilling to purchase an entire mix bottle and an entire bottle of alcohol to try a new mix as this can be a significant cost to try a new mix. However, that same consumer might be willing to try one shaker, or a four, or six pack of shakers. Thus, this provides manufacturers an avenue to show case their mixers at a smaller level which was not previously available. Simultaneously, it provides customers to purchase and try mixers at a smaller level not previously available.

A third advantage is the ability of consumers to offer variety. In a house party scenario, rather than requiring a stocked bar, a consumer can simply have a variety of shakers. There can be margarita shakers for the margarita crowd, Old-Fashioned shakers for those folks, etc. By having a variety of shakers, the host can offer a wide variety of cocktails. Likewise, if camping, a consumer can take one shaker of a certain cereal type and a second shaker of a different similar type as opposed to taking two different cereal boxes on a camping trip. Thus, the consumer can store, carry, and utilize a variety of shaker types.

The shaker can be manufactured using various methods. In one embodiment each can is separately manufactured. Then, the top can 101 is placed atop the bottom can 102. In one embodiment the top can 101 is inverted so that its opening is adjacent to the opening on the bottom can 102. The two cans are releasably coupled by either an external coupling mechanism such as shrink wrap, or the two are fitted via friction fit. In one embodiment the resulting shaker, which contains both the top can 101 and the bottom can 102 are displayed and sold as a unitary item.

As noted, the system can be used for a variety of liquids, foods, and combinations thereof. In other embodiments the system can also include various medicines. As but one example, the bottom can 101 can comprise water, whereas the top can 102 comprises medicine. The medicine can be pills, powder, liquid, etc. In one embodiment the medicine is custom to that user. In other embodiments two or more medicines are mixed in the bottom can 102.

While the invention has been particularly shown and described with reference to a preferred embodiment, it will be understood by those skilled in the art that various changes in form and detail may be made therein without departing from the spirit and scope of the invention.

What is claimed is:

1. A system for a shaker, said system comprising:
   an inverted top can sitting atop and coupled to a bottom can;
   wherein said top can comprises a top can lid, and wherein said bottom can comprises a bottom can lid, and wherein said top can lid and said bottom can lid are adjacent when said inverted top can is coupled to said bottom can;
   wherein said top can comprises a first component, and wherein said bottom can comprises a second component; and
   wherein said top can is smaller than said bottom can;
   wherein said top can has a volume of about 100 mL, and wherein said bottom can has a volume of about 12 ounces;
   wherein said top can has an integral first outer diameter located adjacent to said top can lid, and wherein said bottom can has an integral second outer diameter located adjacent said bottom can lid, wherein said first outer diameter is less than said second outer diameter;
   wherein said first outer diameter nests within said second outer diameter via friction when said first can is coupled to said second can;
   wherein said system further comprises an external coupling to couple said top can with said bottom can; and
   wherein said top can lid comprises a diameter, and wherein said bottom can lid comprises a diameter, and wherein the diameter of the top can lid is less than the diameter of the bottom can lid.

2. The system of claim 1 wherein said bottom can lid results in a 360 opening when removed.

3. The system of claim 1 wherein said first component comprises alcohol and wherein said second component comprises a mixer.

4. The system of claim 1 wherein said inverted top can comprises a sanitary and safety lining.

5. The system of claim 3 wherein said inverted top can comprises 100 mL of said alcohol.

6. The system of claim 1 wherein the inverted top of the top can fits to the top of the bottom can via lid-to-lid mechanical fitment.

7. The system of claim 1 wherein said first component comprises a solute and wherein said second component comprises a solvent.

8. The system of claim 1 wherein said inverted top can comprises a solid and said bottom can comprises a liquid.

9. The system of claim 1 wherein said bottom can has sufficient volume to accommodate both the first and second component.

10. The system of claim 1 wherein after said first component has been poured into the bottom can, the top of the inverted top can is recoupled to form a shaker with the bottom can.

11. The system of claim 1 wherein said bottom can comprises a short filled bottom can.

12. The system of 11 wherein said bottom can comprises a nitrogen blanket.

13. The system of claim 4 wherein said sanitary and safety lining comprises BPA.

14. The system of claim 1 wherein said bottom can comprises aluminum, and wherein said top can comprises tin.

15. The system of claim 1 wherein said top can comprises a top end diameter, and a bottom end diameter, and wherein said top end diameter is dissimilar from said bottom end diameter.

16. The system of claim 1 wherein said top can comprises generally non-parallel side walls, and wherein said bottom can comprises generally parallel side walls.

17. The system of claim 1 wherein said top can comprises a first shape, and wherein said bottom can comprises a dissimilar shape.

18. The system of claim 1 wherein said top can comprises a generally conical shape and wherein said bottom can comprises a generally cylindrical shape.

\* \* \* \* \*